United States Patent
Park et al.

(10) Patent No.: US 11,040,623 B2
(45) Date of Patent: Jun. 22, 2021

(54) MANUAL SERVICE DISCONNECT FOR BATTERY SYSTEM

(71) Applicant: SAMSUNG SDI CO., LTD., Yongin-si (KR)

(72) Inventors: Kyung Hoon Park, Yongin-si (KR); Peel Sik Jeon, Yongin-si (KR); Soo Deok Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/479,546

(22) PCT Filed: Oct. 26, 2017

(86) PCT No.: PCT/KR2017/011903
§ 371 (c)(1),
(2) Date: Jul. 19, 2019

(87) PCT Pub. No.: WO2018/135727
PCT Pub. Date: Jul. 26, 2018

(65) Prior Publication Data
US 2019/0363492 A1    Nov. 28, 2019

(30) Foreign Application Priority Data

Jan. 23, 2017   (KR) .................. 10-2017-0010610

(51) Int. Cl.
*H01R 4/66*        (2006.01)
*B60L 3/00*        (2019.01)
(Continued)

(52) U.S. Cl.
CPC ............... *B60L 3/00* (2013.01); *B60L 3/04* (2013.01); *H01R 13/6335* (2013.01); *H01R 13/648* (2013.01)

(58) Field of Classification Search
CPC ......... H01R 31/02; H01R 31/06; Y02E 60/12; H01H 85/20; H01H 9/102; H01H 85/0417
(Continued)

(56) References Cited

U.S. PATENT DOCUMENTS 4,173,383 A * 11/1979 Lee ..................... H01R 27/00
                                                    439/105
4,386,333 A *  5/1983 Dillan ................. H01F 29/00
                                                    336/107
(Continued)

FOREIGN PATENT DOCUMENTS

CN      104716289 A     6/2015
EP      2 672 573 A1   12/2013
(Continued)

OTHER PUBLICATIONS

Korean International Search Report with English Translation for corresponding Korean International Application No. PCT/KR2017/011903, dated Feb. 6, 2018, 5 pages.

*Primary Examiner* — Thanh Tam T Le
(74) *Attorney, Agent, or Firm* — Lewis Roca Rothgerber Christie LLP

(57) ABSTRACT

Disclosed is a manual service disconnect comprising: an upper housing which has thereinside a plate-shaped upper bus bar terminal; and a lower housing comprising a lower bus bar terminal of which the top is opened so as to be coupled to the upper housing, the lower bus bar terminal having thereinside a first bus bar terminal and a second bus bar terminal which, when being coupled to the upper housing, electrically contact, in the form of a slot, the upper bus bar terminal on the front surface and the rear surface, wherein the first bus bar terminal comprises a first contact part which contacts the upper bus bar terminal and a first plug part extending from the first contact part, and the
(Continued)

second bus bar terminal comprises a second contact part which contacts the upper bus bar terminal and a second plug part extending from the second contact part.

10 Claims, 7 Drawing Sheets

(51) Int. Cl.
  *B60L 3/04* (2006.01)
  *H01R 13/633* (2006.01)
  *H01R 13/648* (2006.01)
(58) Field of Classification Search
  USPC ......... 439/105, 500, 638; 337/187, 194, 255
  See application file for complete search history.

(56) References Cited

U.S. PATENT DOCUMENTS

| | | | |
|---|---|---|---|
| 4,579,410 A * | 4/1986 | Soloman | H01R 31/06 439/133 |
| 5,033,973 A * | 7/1991 | Pruehs | H01R 29/00 439/167 |
| 5,129,841 A * | 7/1992 | Allina | H01R 13/115 439/508 |
| 5,385,486 A * | 1/1995 | Robinson | H02B 1/03 361/659 |
| 5,409,397 A * | 4/1995 | Karman | H01R 13/6335 439/105 |
| 6,015,314 A * | 1/2000 | Benfante | G01R 11/04 361/662 |
| 6,039,608 A * | 3/2000 | Amero, Jr. | H01R 13/71 439/518 |
| 6,500,025 B1 * | 12/2002 | Moenkhaus | H01R 27/00 439/218 |
| 6,840,813 B2 * | 1/2005 | Kim | H01R 29/00 439/189 |
| 6,875,040 B1 * | 4/2005 | O'Keefe | H01R 13/6392 439/346 |
| 6,929,515 B1 * | 8/2005 | Schneider | H01R 27/00 439/654 |
| 7,465,176 B2 * | 12/2008 | Liao | H01R 27/00 439/172 |
| 7,522,406 B2 * | 4/2009 | Seff | G01R 11/04 361/660 |
| 8,854,797 B2 | 10/2014 | Ikeda et al. | |
| 8,951,075 B2 * | 2/2015 | Ekchian | H01R 13/4538 439/170 |
| 9,083,110 B2 * | 7/2015 | McClelland | H01R 13/6205 |
| 9,251,985 B2 * | 2/2016 | Garascia | H01H 85/2045 |
| 9,397,459 B2 | 7/2016 | Butcher et al. | |
| 9,472,899 B1 * | 10/2016 | Reedy | H01R 31/06 |
| 9,509,096 B2 * | 11/2016 | Zhao | H01R 13/688 |
| 9,559,467 B1 * | 1/2017 | Khorrami | H01R 13/187 |
| 9,634,441 B2 * | 4/2017 | Kim | H01R 13/707 |
| 9,800,002 B2 * | 10/2017 | Cheng | H01R 24/68 |
| 2012/0224309 A1 | 9/2012 | Ikeda et al. | |
| 2014/0187071 A1 | 7/2014 | Rule-Greet et al. | |
| 2014/0193990 A1 | 7/2014 | Zhao et al. | |
| 2015/0042442 A1 | 2/2015 | Garascia et al. | |

FOREIGN PATENT DOCUMENTS

| | | |
|---|---|---|
| JP | 2002-124175 A | 4/2002 |
| JP | 2011-154881 A | 8/2011 |
| JP | 2012-186016 A | 9/2012 |
| KR | 10-2015-0104603 A | 9/2015 |
| KR | 10-2016-0026992 A | 3/2016 |

* cited by examiner

MANUAL SERVICE DISCONNECT FOR BATTERY SYSTEM

CROSS-REFERENCE TO RELATED APPLICATION(S)

This application is a National Phase Patent Application and claims priority to and the benefit of International Application Number PCT/KR2017/011903, filed on Oct. 26, 2017, which claims priority to Korean Patent Application Number 10-2017-0010610, filed on Jan. 23, 2017, the entire contents of all of which are incorporated herein by reference.

TECHNICAL FIELD

The present invention relates to a power disconnecting system for an electric vehicle, and more particularly, to a manual service disconnect for cutting off power of a battery system used for an electric vehicle.

BACKGROUND ART

Batteries, such as those for electric vehicles or hybrid vehicles, generally include a plurality of cells grouped together as a battery pack. The battery pack may include battery distribution units that manage the power capacity and functionality of the battery pack. The battery distribution units are generally mounted within an outer casing housing the battery pack.

The battery pack may also include, for example, manual service disconnects that allow disconnecting of the high-current power circuit of the battery pack, such as for service of the battery pack. The manual service disconnect may include a high-current fuse creating a fused electrical path for the battery pack coupling with a high voltage interlock (HVIL) controlling the operation of the high-current electrical circuit.

Meanwhile, in order to allow the battery pack to be serviced, the battery system needs to be configured such that the manual service disconnect (MSD) can be easily connected and disconnected, and the battery pack and the manual service disconnect have reduced sizes. Accordingly, there is a need for a new manual service disconnect having a simplified structure and capable of increasing a contact sectional area of a terminal.

Technical Problems to be Solved

The present invention provides a manual service disconnect of a battery system, which can easily repair a failure by simplifying the internal structure.

The present invention also provides a manual service disconnect of a battery system, which has a simplified structure and can increase a conducting capacity by a large contact area.

The present invention also provides a manual service disconnect of a battery system, which can be reduced in size and weight.

Technical Solutions

In accordance with an aspect of the present invention, the above and other objects can be accomplished by providing a manual service disconnect including an upper housing which has thereinside a plate-shaped upper bus bar terminal, and a lower housing comprising a lower bus bar terminal of which the top is opened so as to be coupled to the upper housing, the lower bus bar terminal having thereinside a first bus bar terminal and a second bus bar terminal which, when being coupled to the upper housing, electrically contact, in the form of a slot, the upper bus bar terminal on the front surface and the rear surface, wherein the first bus bar terminal comprises a first contact part which contacts the upper bus bar terminal and a first plug part extending from the first contact part, and the second bus bar terminal comprises a second contact part which contacts the upper bus bar terminal and a second plug part extending from the second contact part.

In an embodiment, the first contact part and the second contact part may be arranged to face each other, and the first plug part and the second plug part may extend from the first contact part and the second contact part, respectively, so as to be arranged to alternate each other.

Here, the first plug part may be coplanarly positioned with the first contact part, and the second plug part may be coplanarly positioned with the second contact part.

In an embodiment, the first plug part may be located at a different region from the second plug part when viewed in a direction perpendicular to planes of the first bus bar terminal and the second bus bar terminal, so that there is no region where the first plug part and the second plug part face each other. Specifically, the first plug part may extend from an edge of a bottom surface of the first contact part, the first plug part extending only from a first region of the edge of the bottom surface of the first contact part, the second plug part may extend from an edge of a bottom surface of the second contact part, the second plug part extending only from a second region of the edge of the bottom surface of the second contact part, and the first region and the second region may be regions spaced apart from each other when viewed in a direction perpendicular to planes of the first bus bar terminal and the second bus bar terminal.

In an embodiment, the first bus bar terminal may have an inverted L-shaped '⌐' configuration and the second bus bar terminal may have a clockwise rotated L-shaped '⌐' configuration.

Here, a distance between the first bus bar terminal and the second bus bar terminal may correspond to a thickness of the upper bus bar terminal.

In another embodiment, the manual service disconnect may include a service plug unit including the upper housing and the lower housing, and a disconnect header unit detachably coupled to the service plug unit, detachably mounted on the battery system and a housing part installed outside to serve as a handle.

Advantageous Effects

As described above, the manual service disconnect according to an embodiment of the present invention can easily repair a failure by simplifying a terminal structure inside a service plug unit.

In addition, the manual service disconnect according to an embodiment of the present invention has a simplified structure by a terminal configured in the form of a slot and can increase conducting capacity by a large contact area.

In addition, the manual service disconnect according to an embodiment of the present invention can be reduced in size by a simplified internal structure, so that it can be used for a battery system required to have a reduced size.

BEST MODE FOR CARRYING OUT THE INVENTION

Figure 1:
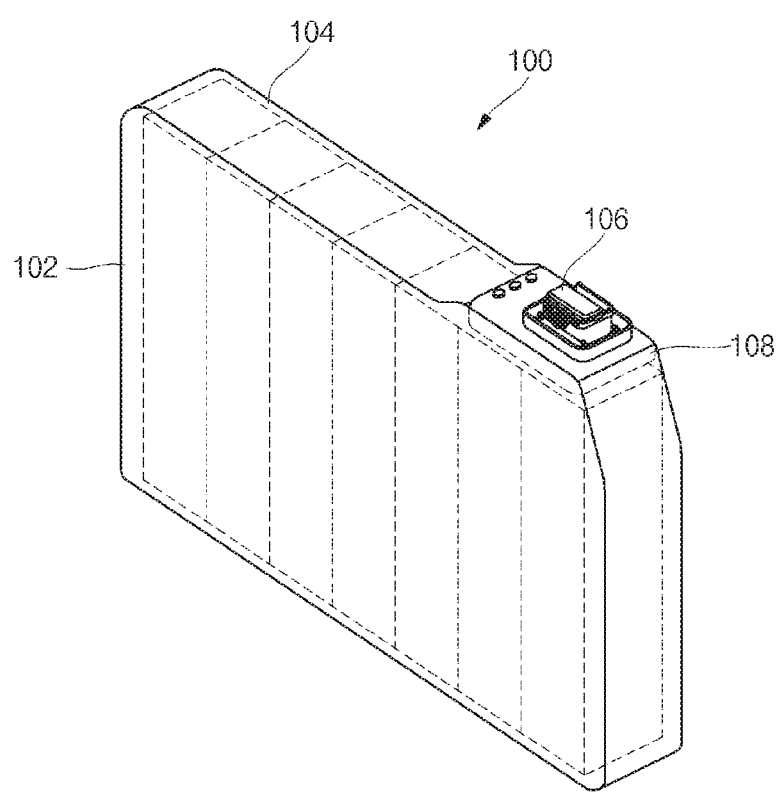
FIG. 1 illustrates a battery system according to an embodiment of the present invention.

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 2:
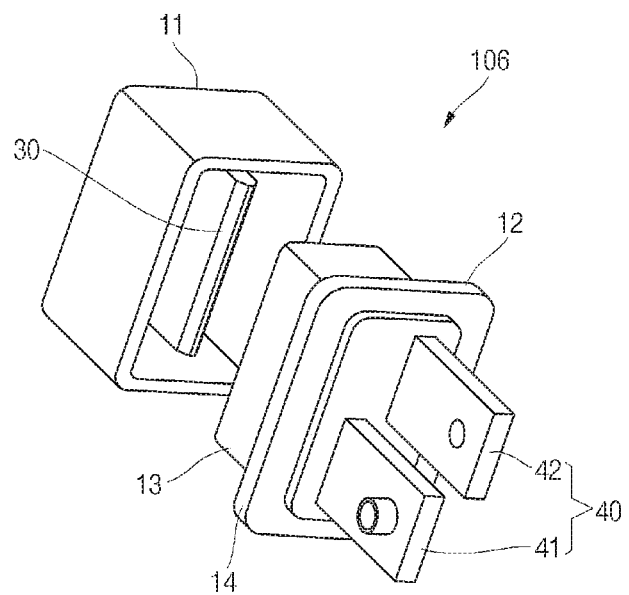
FIG. 2 is an exploded perspective view showing a manual service disconnect according to an embodiment of the present invention is disassembled into an upper housing and a lower housing.
Figure 3:
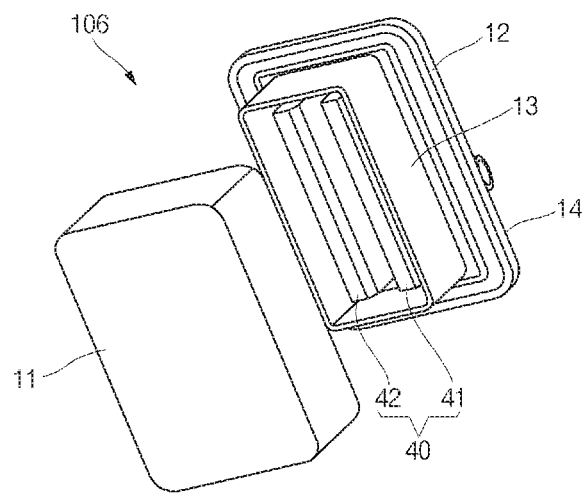
FIG. 3 is an exploded perspective view of the manual service disconnect shown in FIG. 2, viewed at a different angle.
Figure 4:
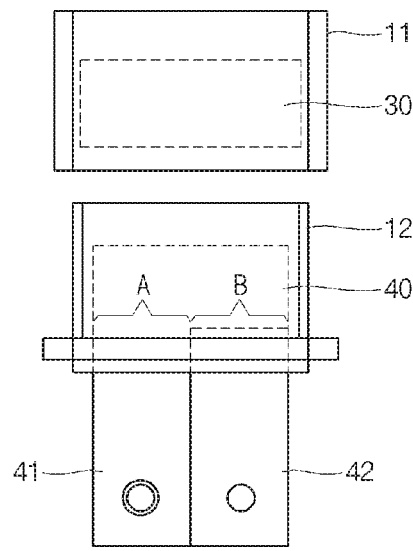
FIG. 4 is a front view of the manual service disconnect shown in FIG. 2.
Figure 5:
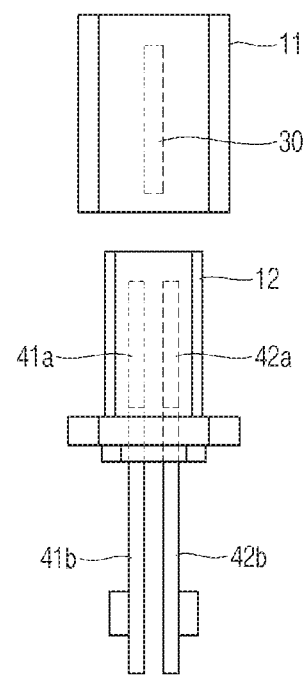
FIG. 5 is a side view of the manual service disconnect shown in FIG. 2.
Figure 6:
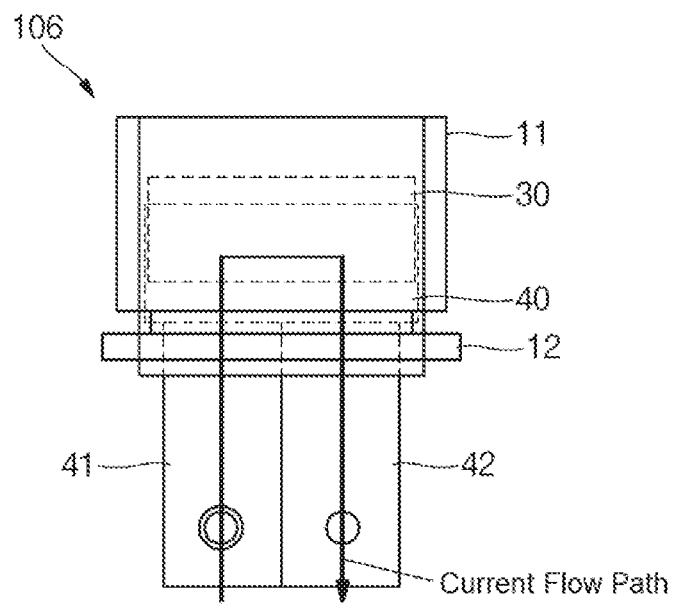
FIG. 6 illustrates an assembled structure of the manual service disconnect shown in FIG. 2 and a current flow.
Figure 7:
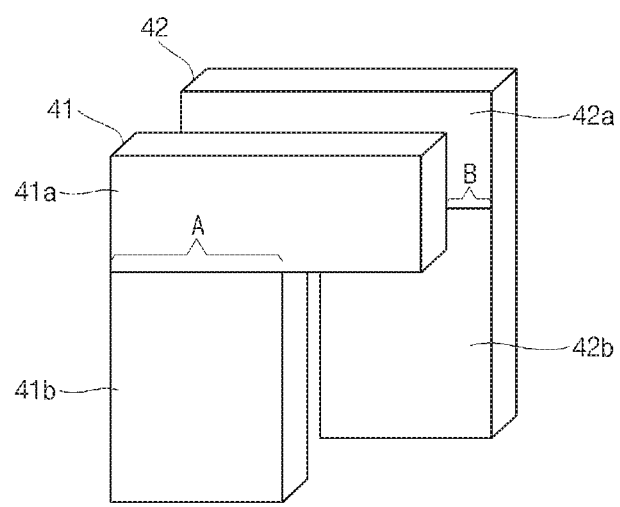
FIG. 7 illustrates a lower bus bar terminal of a manual service disconnect according to an embodiment of the present invention.

FIG. 1 illustrates a battery system according to an embodiment of the present invention. FIG. 2 is an exploded perspective view showing a manual service disconnect according to an embodiment of the present invention is disassembled into an upper housing and a lower housing. FIG. 3 is an exploded perspective view of the manual service disconnect shown in FIG. 2, viewed at a different angle. FIG. 4 is a front view of the manual service disconnect shown in FIG. 2. FIG. 5 is a side view of the manual service disconnect shown in FIG. 2. FIG. 6 illustrates an assembled structure of the manual service disconnect shown in FIG. 2 and a current flow. FIG. 7 illustrates a lower bus bar terminal of a manual service disconnect according to an embodiment of the present invention.

Figure 8:
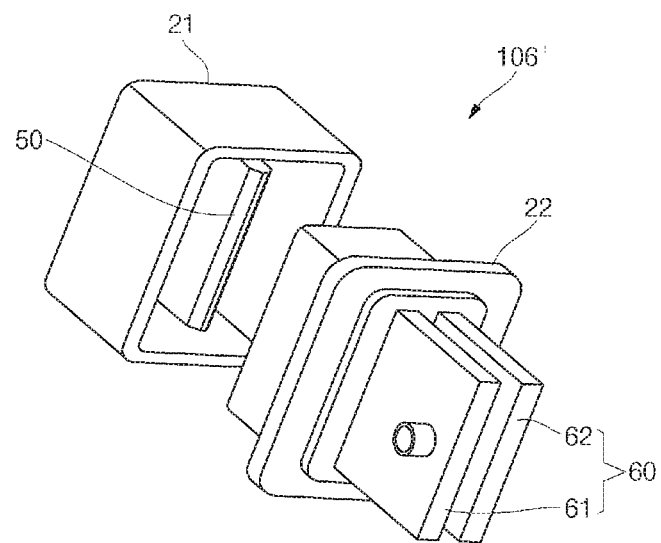
FIG. 8 is an exploded perspective view showing a manual service disconnect according to another embodiment of the present invention is disassembled into an upper housing and a lower housing.
Figure 9:
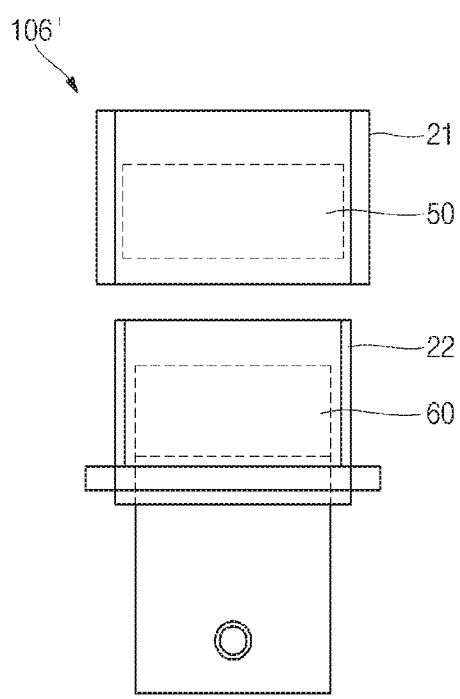
FIG. 9 is a front view of the manual service disconnect shown in FIG. 8.
Figure 10:
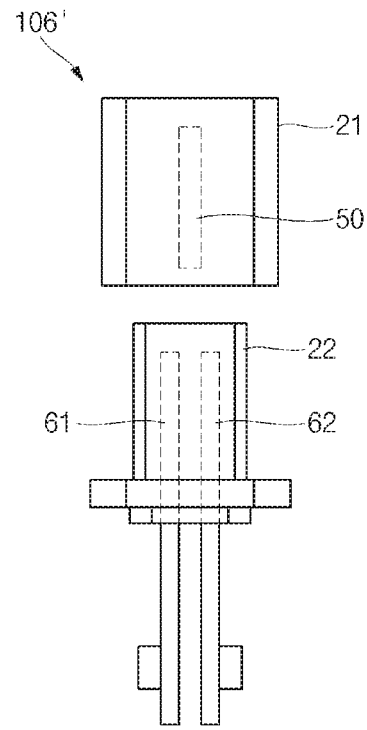
FIG. 10 is a side view of the manual service disconnect shown in FIG. 8.
Figure 11:
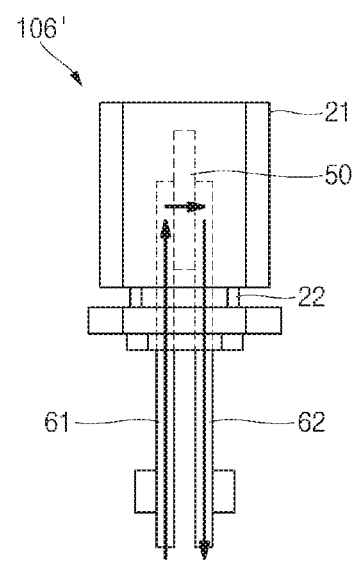
FIG. 11 illustrates an assembled structure of the manual service disconnect shown in FIG. 2 and a current flow.
Figure 12:
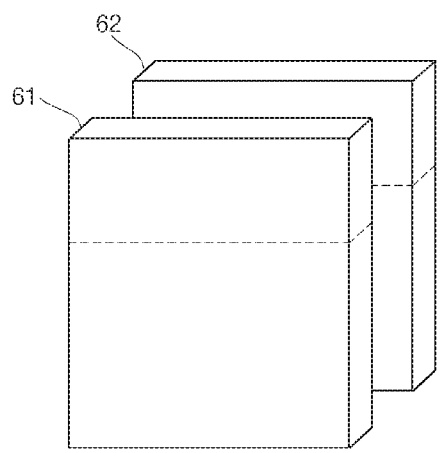
FIG. 12 illustrates a lower bus bar terminal of a manual service disconnect according to another embodiment of the present invention.

FIG. 8 is an exploded perspective view showing a manual service disconnect according to another embodiment of the present invention is disassembled into an upper housing and a lower housing. FIG. 9 is a front view of the manual service disconnect shown in FIG. 8. FIG. 10 is a side view of the manual service disconnect shown in FIG. 8. FIG. 11 illustrates an assembled structure of the manual service disconnect shown in FIG. 2 and a current flow. FIG. 12 illustrates a lower bus bar terminal of a manual service disconnect according to another embodiment of the present invention.

In general, an electric car or an electric vehicle (EV) uses electric batteries and an electric motor, instead of oil fuel and an engine.

In order to safely manage and handle high-voltage batteries or high-capacity batteries for use in electric cars, hybrid vehicles, etc., safety measures need to be taken by an electrically controlling method and a physical method. Among safety devices for performing the safety measures, a power cutting-off system for an electric car is a manual service disconnect (MSD), which is a system capable of selectively cutting off battery power to be supplied to an electric car by the physical method. That is to say, the MSD is configured to physically cut off high-voltage battery power and is commercially available in various trade names including, for example, a safety plug, a service plug, and a disconnect switch, according to their manufacturers.

Referring to FIG. 1, the battery system 100 according to an embodiment of the present invention may include a battery pack 102 located in a chassis or an outer casing 104 and a manual service disconnect (MSD) 106 mounted in vicinity of the battery pack 102. For example, the MSD 106 may be directly mounted in the outer casing 104. Otherwise, the MSD 106 may be mounted in another structure in vicinity of the battery pack 102.

The battery pack 102 may become a component of a high-voltage energy storage system. For example, the battery pack 102 may be used in automotive applications, such as, for example, a component of an electric vehicle or a hybrid electric vehicle.

In an example embodiment, the battery system 100 may include a battery distribution unit 108 managing power capacity and functionality of the battery system 100 by measuring the current of the battery pack 102 and adjusting power distribution of the battery pack 102. The battery system 100 may include a high current power circuit and a low current power circuit, both of which may be electrically connected to the battery pack 102 and the battery distribution unit 108. The MSD 106 may operate to disconnect the high current power circuit, while maintaining a connected state of the low current power circuit even when the MSD 106 is disconnected from the battery system 100.

The MSD 106 is electrically connected to the battery distribution unit 108. The battery distribution unit 108 may be installed inside or outside the outer casing 104. The battery distribution unit 108 may be electrically connected to the battery pack 102.

The battery distribution unit 108 may monitor and/or control operations of the components of the battery system 100. The battery distribution unit 108 may measure a battery health of the battery pack 102 or may respond to the measured battery health. The battery distribution unit 108 may measure a battery state of the battery pack 102 or may respond to the measured battery state. The battery distribution unit 108 may monitor an overvoltage and/or low voltage condition of the battery pack 102 or may respond to monitored condition. In addition, the battery distribution unit 108 may manage charge functions of the battery pack 102.

The MSD 106 may largely consist of a service plug unit and a disconnect header unit. The disconnect header unit may mean a unit mounted on a cover of a device, such as, for example, a battery pack of an electric car. However, the device may not be limited to the battery pack, and the disconnect header unit may be mounted on a cover of any device needed to cut off the current by connecting/disconnecting the MSD 106 to/from the unit of the device, other than the battery pack. Hereinafter, for the sake of convenient explanation, the unit mounted on the battery pack cover will be described by way of example with regard to the disconnect header unit.

The disconnect header unit may be fixedly coupled to a battery cover. The fixed disconnect header unit may be configured such that battery power is connected when the service plug unit is mounted, and the power is cut off when the service plug unit is disconnected and removed.

Meanwhile, the manual service disconnect 106 may include only the service plug unit without the disconnect header unit. The manual service disconnect 106 may be implemented by combining the service plug unit with the disconnect header unit.

The manual service disconnect 106 or the service plug unit may be disassembled into an upper housing 11 and a low housing 12, as shown in FIG. 2.

The upper housing 11 may have an upper bus bar terminal 30 located therein. The upper bus bar terminal 30 may be shaped of a plate and may be fixed to an internal top surface of the upper housing 11. The upper bus bar terminal 30 may be fixed to the inner part of the upper housing 11 using fixing hooks or may be coupled to the inner part of the upper housing 11 using bolts. Otherwise, the upper bus bar terminal 30 may be fixed to the inner part of the upper housing 11 in a variety of manners. The upper housing 11 is configured such that its top surface is closed and its bottom surface is opened to expose the upper bus bar terminal 30. While the upper housing 11 shown in FIG. 2 has a rectangular side surface, the side surface of the upper housing 11 may be elliptical, circular or other shapes.

The lower housing 12 is configured such that its top surface is opened to be coupled to the upper housing 11 and a lower bus bar terminal 40 protrudes at its bottom surface.

The lower housing 12 may have an external size smaller than an internal size of the upper housing 11 so as to be inserted into the upper housing 11, or may have an external size larger than an external size of the upper housing 11 so as to accommodate the upper housing 11.

In addition, as shown in FIG. 2, if the lower housing 12 is configured to be inserted into the upper housing 11, the lower housing 12 may include an insertion part 13 inserted into the upper housing 11, and a projecting part 14 projecting to a side surface of the lower housing 12 to be coupled to the bottom portion of the lower housing 12 to serve as a stopper for preventing the lower housing 12 from being inserted more than a predetermined depth when the lower housing 12 is inserted into the battery system or the disconnect header unit.

In addition, the lower housing 12 may include a lower bus bar terminal 40 electrically contacting the upper bus bar terminal 30 on the front surface and the rear surface in the form of a slot when the upper housing 11 and the lower housing 12 are assembled. The lower bus bar terminal 40 may include a pair of conductive terminals separated from each other and may be coupled to the upper bus bar terminal 30 to establish a current flow path.

The lower bus bar terminal 40 includes a first bus bar terminal 41 and a second bus bar terminal 42. Referring to FIG. 7, the first bus bar terminal 41 may include a first contact part 41a which contacts the upper bus bar terminal 30 and a first plug part 41b downwardly extending from the first contact part 41a and protruding to an exterior side of the lower housing 12. In addition, the second bus bar terminal 42 may include a second contact part 42a which contacts the upper bus bar terminal 30 and a second plug part 42b downwardly extending from the second contact part 42a and protruding to an exterior side of the lower housing 12. Here, the first plug part 41b is coplanarly positioned with the first contact part 41a, and the second plug part 42b coplanarly positioned with the second contact part 42a.

As shown in FIG. 7, the first contact part 41a and the second contact part 42a are arranged to face each other. Here, the first contact part 41a and the second contact part 42a are preferably arranged to be spaced apart from each other by a distance corresponding to a thickness of the upper bus bar terminal 30. In addition, top ends of the first contact part 41a and the second contact part 42a are preferably shaped to have inclined top sections or round edges so as to allow the upper bus bar terminal 30 to be easily inserted into a space between the first contact part 41a and the second contact part 42a. As shown in FIG. 2, the bottom end of the upper bus bar terminal 30 may be shaped to have an inclined bottom section or a round edge.

Referring back to FIG. 7, the first plug part 41b and the second plug part 42b are alternately arranged so as not to face each other. That is to say, the first plug part 41b extends from an edge of a bottom surface of the first contact part 41a, specifically from only a first region A of the edge of the bottom surface of the first contact part 41a. The second plug part 42b extends from an edge of a bottom surface of the second contact part 42a, specifically from only a second region B of the edge of the bottom surface of the second contact part 42a. In addition, as shown in FIGS. 4 and 7, the first region A and the second region B are preferably regions spaced apart from each other when viewed in a direction perpendicular to planes of the first bus bar terminal 41 and the second bus bar terminal 42.

Accordingly, the first plug part 41b is located at a different region from the second plug part 42b when viewed in a direction perpendicular to planes of the first bus bar terminal 41 and the second bus bar terminal 42, so that there is no region where the first plug part 41b and the second plug part 42b face each other.

In an example embodiment, as shown in FIG. 7, the first bus bar terminal 41 has an inverted L-shaped '[' configuration and the second bus bar terminal 42 has a clockwise rotated L-shaped ']' configuration.

Hence, as shown in FIG. 2, the lower bus bar terminal 40 is shaped of parallel terminals of the alternately arranged plug parts 41b and 42b.

FIGS. 4 and 5 are a front view and a side view of the manual service disconnect shown in FIG. 2. As shown in FIGS. 4 and 5, the upper bus bar terminal 30 is a plate-shaped terminal, and the lower bus bar terminal 40 includes a pair of terminals spaced apart from each other by a distance corresponding to a thickness of the upper bus bar terminal 30. As shown in FIG. 6, if the upper housing 11 and the lower housing 12 are assembled, the upper bus bar terminal 30 is inserted into a space between the pair of terminals of the lower bus bar terminal 40 in the form of a slot to then be electrically connected to each other. Accordingly, the current may flow from the first bus bar terminal 41 to the second bus bar terminal 42 through the upper bus bar terminal 30.

As described above, the manual service disconnect according to an embodiment of the present invention can be easily fabricated by simplified structures of the terminals provided inside the service plug unit and can be easily repaired in an event of a failure. In addition, the manual service disconnect according to an embodiment of the present invention can have a simplified structure by a terminal configured in the form of a slot and can increase conducting capacity by a large contact area. Moreover, the manual service disconnect according to an embodiment of the present invention can be reduced in size by a simplified internal structure, so that it can be used for a battery system required to have a reduced size.

FIGS. 8 and 9 show a manual service disconnect 106' according to another embodiment of the present invention. The manual service disconnect 106' according to another embodiment of the present invention may be disassembled into an upper housing 21 and a lower housing 22, like the manual service disconnect 106 shown in FIG. 2.

The upper housing 21 may include an upper bus bar terminal 50 located therein, like the upper housing 11 shown in FIG. 2. The upper bus bar terminal 50 may also be shaped of a plate shape, like the upper bus bar terminal 30 shown in FIG. 2, and may be fixed to an internal top surface of the upper housing 21.

The lower housing 22 is configured such that its top surface is opened to be coupled to the upper housing 21 and a lower bus bar terminal 60 protrudes at its bottom surface.

The lower housing 22 may include a lower bus bar terminal 60 electrically contacting the upper bus bar terminal 50 on the front surface and the rear surface in the form of a slot when the upper housing 21 and the lower housing 22 are assembled. The lower bus bar terminal 60 may include a pair of conductive terminals separated from each other and may be coupled to the upper bus bar terminal 50 to establish a current flow path.

The lower bus bar terminal 60 includes a first bus bar terminal 61 and a second bus bar terminal 62. Referring to FIG. 12, the first bus bar terminal 61 and the second bus bar terminal 62 have the same shape of a plate and are arranged to face each other. Here, the first bus bar terminal 61 and the second bus bar terminal 62 are preferably arranged to be spaced apart from each other by a distance corresponding to a thickness of the upper bus bar terminal 50. In addition, top ends of the first bus bar terminal 61 and the second bus bar terminal 62 are preferably shaped to have inclined top sections or round edges so as to allow the upper bus bar terminal 50 to be easily inserted into a space between the first bus bar terminal 61 and the second bus bar terminal 62. As shown in FIG. 8, the bottom end of the upper bus bar terminal 50 may be shaped to have an inclined bottom section or a round edge.

As shown in FIG. 12, the first bus bar terminal 61 includes a first contact part which contacts the upper bus bar terminal 50 and a first plug part extending from the first contact part. Here, the first contact part and the first plug part may have the same width on the same plane. The second bus bar terminal 62 includes a second contact part which contacts the upper bus bar terminal 50 and a second plug part extending from the second contact part. Here, the second contact part and the second plug part may have the same width on the same plane.

Referring to FIG. 11, when the upper housing 21 and the lower housing 22 are assembled, the upper bus bar terminal 50 may be inserted into a pair of lower bus bar terminals 60 parallel with each other to be electrically connected. Accordingly, the current may flow from the first bus bar terminal 61 to the second bus bar terminal 62 through the upper bus bar terminal 50.

As shown in FIGS. 9 and 10, the lower bus bar terminal 60 may also include a pair of plate-shaped wide terminals, and the upper bus bar terminal 50 may include a plate-shaped wide terminal, thereby simplifying the internal structure of the manual service disconnect 106'. In addition, the conducting capacity may be greatly increased by an increased contact area. Further, the manual service disconnect 106' may be reduced in size and thickness.

Although the foregoing embodiments have been described to practice the manual service disconnect of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

| [Explanation of Reference Numerals] | |
|---|---|
| 100: Battery system | 102: Battery pack |
| 104: Outer casing | 106, 106': Manual service disconnect |
| 108: Battery distribution unit | 11, 21: Upper housing |
| 12, 22: Lower housing | 13: Insertion part |
| 14: Projecting part | 30, 50: Upper bus bar terminal |
| 40, 60: Lower bus bar terminal | 41, 61: First bus bar terminal |
| 41a: First contact part | 41b: First plug part |
| 42, 62: Second bus bar terminal | 42a: Second contact part |
| 42b: Second plug part | |

The invention claimed is:

1. A manual service disconnect comprising:
    an upper housing which has thereinside a single plate-shaped upper bus bar terminal; and
    a lower housing of which a top thereof is opened so as to be detachably coupled to the upper housing, the lower housing comprising a lower bus bar terminal thereinside, the lower bus bar terminal having a first bus bar terminal and a second bus bar terminal spaced apart from each other to define a slot therebetween and which, when the lower housing is coupled to the upper housing, electrically contact the upper bus bar terminal on a front surface and a rear surface of the upper bus bar terminal,
    wherein the first bus bar terminal comprises a first contact part which contacts the front surface of the upper bus bar terminal and a first plug part extending from the first contact part, and the second bus bar terminal comprises a second contact part which contacts the rear surface of the upper bus bar terminal and a second plug part extending from the second contact part, and wherein, when the lower housing is coupled to the upper housing, the upper bus bar terminal is received in the slot so as to contact each of the first contact part and the second contact part such that the first plug part and the second plug part are electrically connected to each other.

2. The manual service disconnect of claim 1, wherein the first contact part and the second contact part are arranged to face each other, and the first plug part and the second plug part extend from the first contact part and the second contact part, respectively, so as to be arranged to alternate with each other.

3. The manual service disconnect of claim 2, wherein the first plug part is coplanarly positioned with the first contact part, and the second plug part is coplanarly positioned with the second contact part.

4. The manual service disconnect of claim 2, wherein the first plug part is located at a different region from the second plug part when viewed in a direction perpendicular to planes of the first bus bar terminal and the second bus bar terminal, so that there is no region where the first plug part and the second plug part face each other.

5. The manual service disconnect of claim 4, wherein the first plug part extends from an edge of a bottom surface of the first contact part, the first plug part extending only from a first region of the edge of the bottom surface of the first contact part,
    the second plug part extends from an edge of a bottom surface of the second contact part, the second plug part extending only from a second region of the edge of the bottom surface of the second contact part, and
    the first region and the second region are regions spaced apart from each other when viewed in the direction perpendicular to planes of the first bus bar terminal and the second bus bar terminal.

6. The manual service disconnect of claim 5, wherein the first bus bar terminal has an inverted L-shaped '[' configuration and the second bus bar terminal has a clockwise rotated L-shaped ']' configuration.

7. The manual service disconnect of claim 1, wherein a distance between the first bus bar terminal and the second bus bar terminal corresponds to a thickness of the upper bus bar terminal.

8. The manual service disconnect of claim 1, comprising:
    a service plug unit including the upper housing and the lower housing; and
    a battery distribution unit coupled to the service plug unit, and mounted on a battery system.

9. The manual service disconnect of claim 1, wherein one of the upper housing and the lower housing is insertable into the other of the upper housing and the lower housing.

10. The manual service disconnect of claim 1, wherein the first plug part and the second plug part protrude to an outside of the lower housing.

* * * * *